United States Patent
Petri et al.

(10) Patent No.: US 11,751,985 B2
(45) Date of Patent: Sep. 12, 2023

(54) APPARATUS AND METHOD FOR DELIVERING DROPLETS OF FLUID ONTO POULTRY HATCHLINGS

(71) Applicant: Erber Aktiengesellschaft, Getzersdorf bei Traismauer (AT)

(72) Inventors: Daniel Petri, Vienna (AT); Luca Stefano Vandi, Forli (IT); Eva Maria Binder, Tulln (AT); Martin Pfeffer, Tulln (AT); Stephen Charles John Cole, Würmla (AT); Dante Lorini, Crema (IT)

(73) Assignee: ERBER AKTIENGESELLSCHAFT, Traismauer (AT)

( * ) Notice: Subject to any disclaimer, the term of this patent is extended or adjusted under 35 U.S.C. 154(b) by 369 days.

(21) Appl. No.: 16/631,485

(22) PCT Filed: Jul. 17, 2018

(86) PCT No.: PCT/EP2018/000357
§ 371 (c)(1),
(2) Date: Jan. 16, 2020

(87) PCT Pub. No.: WO2019/020210
PCT Pub. Date: Jan. 31, 2019

(65) Prior Publication Data
US 2020/0170769 A1    Jun. 4, 2020

(30) Foreign Application Priority Data
Jul. 24, 2017    (EP) .................................... 17001263

(51) Int. Cl.
*A61D 7/00*    (2006.01)
*A61D 1/02*    (2006.01)
(Continued)

(52) U.S. Cl.
CPC ............... *A61D 7/00* (2013.01); *A61D 1/025* (2013.01); *B05C 11/1044* (2013.01); *B05D 1/02* (2013.01)

(58) Field of Classification Search
CPC . A01K 5/00; A01K 7/02; A01K 29/00; A01K 39/00; A01K 45/00; A01K 45/002;
(Continued)

(56) References Cited

U.S. PATENT DOCUMENTS

| 4,316,464 A | 2/1982 | Peterson |
| 4,449,968 A * | 5/1984 | Peterson ................ A61D 1/025 604/290 |

(Continued)

FOREIGN PATENT DOCUMENTS

| CA | 2416726 | 7/2004 |
| WO | 96/25951 | 8/1996 |
| WO | 2005/099617 | 10/2005 |

OTHER PUBLICATIONS

International Search Report dated Jan. 3, 2019.

*Primary Examiner* — Peter M Poon
*Assistant Examiner* — Danielle A Clerkley
(74) *Attorney, Agent, or Firm* — Jacobson Holman PLLC

(57) ABSTRACT

A dispensing apparatus (1) for delivering droplets of fluids such as liquids having a low viscosity or being soft gels onto poultry hatchlings that are present in movably mounted hatchling trays (19) comprising at least one reservoir (18), at least one pumping unit (9), connected to at least one reservoir (18), with at least one manifold (8) connected to at least one pumping unit (9), as well as a control unit. The apparatus comprises a plurality of optionally adjustable fluid atomizers (6) being connected by flexible connecting means (7) to at least one manifold (8), whereby the fluid atomizers (6) are detachably and/or slidably connected on at least one mounting rail (5), and that optionally different types of fluid
(Continued)

atomizers (6) are distributed onto the mounting rail (5). Additionally, a method for delivering fluid droplets onto poultry hatchlings present in moving hatchling trays (19) is described.

15 Claims, 3 Drawing Sheets

(51) Int. Cl.
*B05C 11/10* (2006.01)
*B05D 1/02* (2006.01)

(58) Field of Classification Search
CPC ....... B05D 1/02; B05C 11/1044; A61D 1/025; A61D 5/00
USPC .................................. 119/72, 72.5, 602–604
See application file for complete search history.

(56) References Cited

U.S. PATENT DOCUMENTS

| | | | | | |
|---|---|---|---|---|---|
| 4,850,997 | A | | 7/1989 | Dubose | |
| 5,312,353 | A | * | 5/1994 | Boggess | A61D 1/025 604/144 |
| 5,404,922 | A | * | 4/1995 | Sliter | B65B 39/00 141/237 |
| 6,910,446 | B2 | * | 6/2005 | Johnston Jr. | B05B 13/041 119/665 |
| 8,087,386 | B2 | * | 1/2012 | Purswell | A61D 1/025 119/72.5 |
| 8,794,185 | B2 | * | 8/2014 | Lee | A61K 39/012 119/72 |
| 10,898,307 | B2 | * | 1/2021 | Jackwood | A61D 1/025 |
| 2002/0104485 | A1 | | 8/2002 | Lewis | |
| 2005/0001072 | A1 | * | 1/2005 | Bolus | B05B 15/528 239/548 |
| 2016/0338815 | A1 | * | 11/2016 | Nguyen | A61M 11/02 |

* cited by examiner

APPARATUS AND METHOD FOR DELIVERING DROPLETS OF FLUID ONTO POULTRY HATCHLINGS

BACKGROUND OF THE INVENTION

The present invention is directed to a dispensing apparatus for delivering droplets of fluids, such as liquids having a low viscosity or soft gels, onto poultry hatchlings that are present in movably mounted hatchling trays comprising at least one reservoir, at least one pumping unit, each connected to the at least one reservoir, at least one manifold connected to the at least one pumping unit, as well as at least one control unit and a method for delivering fluid droplets onto poultry hatchlings present in moving hatchling trays.

Poultry hatchlings such as chicks or turkeys have to be immunized against various diseases during the first days of their life. Vaccination of the hatchlings will usually be performed by spraying or dropping the vaccine suspended in drinking water applied in the poultry hatchery. Thereby the vaccine is sprayed directly on the hatchlings. The birds will then eat or peck the droplets from the feathers of another animal. Thereby all poultry hatchlings consume sufficient amounts of the vaccine, but this method also has drawbacks. Besides the problem that the vaccine must be evenly distributed in the solution to be sprayed, the amount of water containing the vaccine to be sprayed on the chicks is relatively high and results in a risk at the birds becoming too wet, which will negatively affect the health of the chicks.

Another method for administering a vaccine is to mix it in the drinking water of the poultry hatchlings. But there are many drawbacks, firstly this method requires that the vaccine remains evenly suspended in the drinking water and secondly, it has been shown that such a method will result in an uneven vaccination of the birds.

In WO 96/25951 a gel form vaccine has been described. The vaccine embedded in a sliceable gel is administered by introducing slices of the vaccine containing gel in each hatchling tray. This methods solves the problem that the birds will be too wet but it requires that a separate slice is to be introduced in each tray by hand. This makes the procedure time consuming and therefore ineffective.

US 2002/0104485 A1 describes a dispensing device which controls a rate and an amount of discharge of a substance which may be used to treat animals. The dispensing device has a tank including a top, a bottom and a cover. The dispensing device also includes a dispenser in fluid communication with the tank, and a dispensing head in fluid communication with the dispenser. The dispensing head further includes a plurality of apertures near an outer diameter of the dispensing head.

Furthermore different systems for spraying liquids onto the hatchlings by using dispensing heads which are in fluid communication with a dispenser are described. These dispensing heads are designed as dished plates having a plurality of spray nozzles arranged therein. Examples of such systems are described in US 2002/0104485, U.S. Pat. Nos. 4,850,997 and 4,316,464. These systems suffer from the drawback that the geometry of the spraying head does not allow to dispense the vaccine containing suspension uniformly over the entire hatchling tray, resulting in an uneven vaccination.

A soft gel delivery system for treating poultry has been described in WO 2005/099617. Hereby a soft gel containing the vaccine is dispensed through a delivery system directly onto the birds in a tray. The delivery system contains of a hollow bar being equipped with a plurality of small holes through which the soft gel will be pumped in the bar and dropped on the birds. While this system overcomes the problems of wetting of the chicks and also the problem of introducing separate slices of vaccine containing gel into the trays by hand the problem that the soft gel containing the vaccine is not evenly distributed over the whole tray because most of the soft gel passes out the spray nozzles in the form of small holes directly adjacent the feeding device remains. Thus regions further afar from the feeding device do not receive sufficient amounts of the soft gel due to pressure loss along the hollow bar and thus an uneven vaccination of the chicks is feared.

Thus, there remains the need for a simple and at the same time precise working device for administering at least one fluid selected from the group containing vaccines, probiotic product(s), prebiotic product(s), or other therapeutic and/or healthful substances to poultry hatchlings, which evenly distributes a sufficient amount of active substance over all birds in the tray and assures therefore a rapid and complete application to all birds. Object of the present invention is therefore to provide such a device and a method for delivering therapeutic substances such as probiotic products, prebiotic products, other healthful substances, and/or vaccines to poultry hatchlings by spraying or dropping a fluid evenly over the entire hatchling tray.

SUMMARY OF THE INVENTION

For solving this issue, the present invention is essentially characterized in that the apparatus comprises a plurality of optionally adjustable fluid atomizers being connected by flexible connecting means to the at least one manifold, whereby the fluid atomizers are detachably and/or slidably connected with at least one mounting rail, and that optionally different types of fluid atomizers are distributed onto the mounting rail. By arranging a plurality of optionally adjustable fluid atomizers, which are connected by flexible connecting means to the at least one manifold, it is possible to assure that the at least one fluid is distributed over the hatchling tray. The at least one fluid is evenly supplied to all fluid atomizers to be delivered evenly over the hatchlings, with the same pressure, same droplet size, as well as that all fluid atomizers are fed with the same amount of the fluid to be delivered. By separately connecting each fluid atomizer with the manifold, it is assured that the fluid is pumped in each connecting means connecting the manifold with a fluid atomizer, and therefore the fluid can be evenly distributed over the hatchling trays. In the prior art, systems were known having only one supply, being connected with a manifold and being connected with a dish or bar for distributing the fluid or also soft gel. These devices have the drawback that the delivering pressure of the fluid to be distributed is not the same over the diameter or the length of the distributing unit. It is evident that the pressure is higher beneath the delivery device and it is lower in regions being afar therefrom. With the present dispensing apparatus, it is possible to provide the fluid to be distributed with the pressure to the whole number of fluid atomizers and therefore with the same pressure and the same droplet size over the hatchling trays containing the hatchlings to be treated. By providing fluid atomizers which are detachable and/or slidable and connected with at least one mounting rail it is possible to adjust not only the number of fluid atomizers being provided onto the rail in accordance with the requirements, but also to adjust the apparatus to different sizes of hatchling trays. Hereby, it is possible to supply any width of the hatchling tray with fluid droplets and such an arrangement assures that no region of the tray constitutes a dead space in which the baby chicks are not hit by soft gel droplets. Furthermore by slidably attaching the fluid atomizers onto the mounting rail, it is furthermore possible to arrange the fluid atomizers in any selected distance and number for achieving the best and especially complete coverage with fluid droplets of the area of the tray, and thus of the hatchlings contained therein. By optionally providing different types of fluid atomizers, which are distributed onto the mounting rail, it is possible to deliver at least two different fluids at the same time. For example, it will therefore be possible to feed at the same time a probiotic product as well as a vaccine, whereby both active ingredients may be provided as fluids having different viscosity.

In the context of the present application, fluid means a liquid having a viscosity up to 1000 cps, whereby it is preferred that at least one liquid is a soft gel having a viscosity between 50 and 1000 cps, preferably from 100 to 300 cps and most preferably from 120 to 200 cps. It is additionally preferred that probiotics as active ingredients are supplied within soft gels; and that e.g. vaccines are provided as suspension or solution in a common organic or inorganic solvent or solvent mixture, being a liquid with a lower viscosity of up to 50 cps, preferably from 20 to 50 cps.

For assuring that all poultry hatchlings being contained in one hatchling tray are provided with the fluid to be distributed, the apparatus is further characterized in that a distance between adjacent fluid atomizers on the at least one mounting rail is unevenly distributed on the mounting rail and especially such that the distance between the fluid atomizers is smaller in a middle region of the mounting rail compared to edge regions thereof, the distance between two adjacent fluid atomizers located in the middle region preferably being between 20 to 60% of the distance of two adjacent fluid atomizes located in an edge region. When hatchling trays are filled with poultry hatchlings, the hatchlings are usually conveyed by endless conveyor and fed for a predetermined time into the selected hatchling trays. With such a procedure, the distribution of the hatchlings in the trays is usually uneven, meaning that often the density of hatchlings in each tray varies. Thus, the poultry hatchlings can be cumulated at one side or in the center of the tray, then an uneven distribution of the fluid atomizers onto the mounting rail will be helpful to allow an even and uniform distribution of fluid to all hatchlings in the tray. For being able to adjust the apparatus to different situations, such as variable number of poultry hatchlings per tray, or uneven distribution of hatchlings, the latter sitting in the middle of the of the tray or on the border thereof, the apparatus may be further equipped with a sensor which checks the presence or absence of the hatchlings and sends a signal to an adjustment mechanism of the fluid atomizers, which will be moved in the optimal position for distributing the fluid.

For avoiding that the hatchlings obtain too much of the active ingredient contained in the liquid, and for further avoiding that hatchlings become too wet by the droplets being distributed through the fluid atomizers, the apparatus is further developed in that different types of fluid atomizers are provided, especially fluid atomizers having flow openings with different diameter, or having an adjustable flow opening. By providing different types of fluid atomizers, it is furthermore possible to distribute two different fluids at the same time, which may have also different viscosity. For example the fluid having the higher viscosity is distributed though the fluid atomizers having the larger opening.

According to a further development, the dispensing apparatus comprises different types of fluid atomizers being provided on a single mounting rail. Hereby, it is possible to distribute at the same time for example different droplet sizes or also different fluids having different viscosities without providing additional mounting rails. For assuring that all fluid atomizers are provided directly over the poultry hatchlings contained in a hatchling tray, the fluid atomizers may be provided in an offset manner. Such an arrangement will be easily obtainable for example by providing brackets having different stem length.

By providing such an apparatus, and for obtaining an apparatus being adjustable to different dimensions of the tray, as well as to different working conditions, the apparatus is further developed in that the pumping unit is a pneumatic pump which is actuated to pump the soft gel from the reservoir to the fluid atomizers, and to adjust and/or to swivel the supporting structure into a working or rest position. Hereby, it is possible to adjust and/or swivel the supporting structure into a working or rest position for being able to provide maintenance work, as an example. Furthermore, it is possible to provide the supporting structure made from telescoping bars whereby it is possible to adjust the device not only in width direction but also in height direction. By actuating the supporting structure with aid of the pumping unit, and especially of the pneumatic pump, adjustment of the device is further simplified.

For avoid complicating the design of the apparatus for dispensing different fluids at the same time, for example soft gel and liquid substances, the apparatus is further developed in that it comprises two reservoirs, preferably being each provided with a throttle valve. The provision of a separate throttle valve in each reservoir allows to switch between the reservoirs provided, to close-down one of the reservoirs, for example for maintenance work or also for providing different fluids at the same time. Moreover, such flexibility in device setup allows an apparatus to feed exact amounts of the selected fluid to the fluid atomizers being connected via a manifold with the pumping device.

Especially for being able to provide different fluids at the same time, the dispensing apparatus comprises two pumping units, preferably pumping units providing different pumping powers. Herewith, it is possible to dispense at the same time various fluids with different viscosities, such as a soft gel being pumped with the pump having the greater pumping force, and a low viscosity liquid, being pumped with the pump having the smaller pumping force. Of cause both fluids provided may contain the same or different active ingredients such as probiotic substances, vaccines, antibiotics and so on.

For assuring that no active ingredients containing soft gel and/or low viscosity liquid is dropped outside the tray, the apparatus can be further developed so that the pumping unit is interposed between the reservoir and the manifold and that the pumping unit is actuated by a switching pulse obtained from a proximity sensor. The proximity sensor detects the arrival of each tray and sends a switching pulse to a control unit for switching on the pumping unit and for delivering fluid such as soft gel to the fluid atomizers. Analogously, the proximity sensor detects that the tray has passed and sends a switching pulse to a control unit for switching off the pumping unit. With such further development, it can be assured that only the minimum amount of vaccine, antibiotic and/or probiotic substance in the fluid required, such as soft gel or low viscosity liquid, will be used, and that any losses of the fluid and contamination of the environment by the fluid is avoided.

For providing a uniform amount of fluid to each fluid atomizer, and for avoiding any excess pressure at the fluid atomizers, the device is furthermore characterized in that each pumping unit is a pneumatic pump, actuated to pump the fluid(s) from the reservoir(s) to the fluid atomizers. By providing pneumatic pumps, it is possible to regulate the supply pressure of each fluid, controlling dropping rate as well as the fluid volume in each drop. A fine adjustment of these features can be achieved by adjusting the valve opening of each fluid atomizer, comparing to state of the art where one non-variable, static type of dispenser valve is used. Furthermore, to avoid idle running of the pumping unit, the device is supplied with a proximity sensor which is connected to a control device for detecting the start point of pump action. Hereby the proximity sensor detects the arrival of a hatchling tray, then it sends a signal to the control device which in turn sends a start signal for starting the pump action of the pumping unit. Such an embodiment can help to prolong the lifetime of the pumping unit as well as of the other parts of the apparatus. Furthermore, by providing a proximity sensor, any waste of the probiotic product, prebiotic substance, other healthful substance, and/or vaccine contained in the soft gel and/or low viscosity liquid, can be avoided, resulting in greater return of investment.

For assuring that an equal amount of the fluid(s) to be distributed is fed to each fluid atomizer, the apparatus is further developed in that it comprises two manifolds, being connected with the same pumping unit or with different pumping units. With such an apparatus, it is possible to feed fluid(s) to the manifolds and then to the fluid atomizers and especially to evenly distribute the fluid(s) between all separate fluid atomizers. Moreover, it is possible to use manifolds which do not have too many outlets and therefore all supply devices, such as supply hoses being connected between the manifold and the fluid atomizers, can be chosen such that for example the diameter of the hose guarantees that it will not clogged with the fluid(s), especially when a soft-gel is used.

For further adjusting the delivery device to dimensions of the hatchling tray, and for adjusting the amount of soft gel delivered to the number of chicks contained in the tray, the device is further processed such that at least one mounting rail is adjustable, especially height adjustable, connected to a supporting structure. By providing adjustable mounting rails, which are connected to a supporting structure, it is possible to adjust the apparatus not only to the size of hatchling trays, but also for example if two hatchling trays are arranged one over the other. Such a construction allows to treat two trays at the same time for example with different fluids, being evenly distributed over trays at each level.

According to a further development of the apparatus, it is characterized in that it contains two adjustable mounting rails, preferably on top or adjacent to each other. With such a further development it is not only possible to drop fluids into two hatchling trays at the same time, but it is also possible to use two endless conveyors, preferably arranged adjacent to each other at the same time, and to therefore double the number of poultry hatchlings treated at once.

To be able to change individual fluid atomizers, for example if the fluid atomizers are worn from the mounting rail(s), or also to add further atomizers onto said rail if a lot of hatchlings are to be treated, the invention is furthermore characterized in that it contains up to 28, more preferred up to 20 fluid atomizers, whereby at least 4, more preferred at least 10 fluid atomizers are provided on each mounting rail. For example, by clamping each fluid atomizer on the mounting rail, it is possible to adjust the position of the opening of the atomizer in view of the hatchling tray, or also to swivel it so that its opening can be cleaned easily. With such an embodiment, it is additionally possible to provide sufficient droplets of active agent containing fluid(s) to safely treat all poultry hatchlings contained in each tray whilst all maintenance work can be done without switching off the entire device.

The invention aims furthermore to a method for delivering fluid(s) in droplet form onto poultry hatchlings being present in moving hatchling trays via a procedure assuring that the fluid(s) is(are) dropped onto the hatchlings and that the amount of active ingredient contained in the said fluid(s) is consumed by the hatchlings. The amount of dispensed fluid(s) should be minimized whilst ensuring that all chicks contained in a tray are evenly covered with droplets of fluid(s) containing the active ingredient(s).

To solve this problem, the method according to the present invention is characterized in that at least one fluid containing at least one active component, preferably selected from the group consisting of prebiotic, probiotic, antibiotic and flavoring agents, vaccines, plant extracts, essential oils, amino acids, vitamins, minerals as well as organic acids and optionally coloring agents. The at least one fluid is prepared and placed in at least one reservoir of a fluid dispensing apparatus; the distance between the fluid atomizers is adjusted in accordance with at least one of the features, tray geometry, hatchling distribution in the trays, hatchling density in the tray and/or tray speed; the moving hatchling trays containing the poultry hatchlings are placed beneath the fluid atomizers of the apparatus; the at least one pumping unit is switched on, and the at least one fluid is pumped with a pressure convenient for feeding the at least one fluid from the reservoir through the manifold to the fluid atomizers, distributing the fluid as optionally colored droplets onto the poultry hatchlings. This method guarantees that only the minimum amount of fluid is distributed over the trays, and that by choosing the number of fluid atomizers, the distributing time and the distributing pressure the amount dispensed, the area over which the fluid, such as a low viscosity liquid or a soft gel is spread, as well as the size of droplets can be selected via the atomizer opening selection.

With the method as well as with the device according to the present invention, it is moreover possible to administer a soft gel which contains a liquid carrier such as carbohydrate-based and/or mineral-based water stabilizing compounds. Carbohydrate-based water stabilizing compounds preferably contain amino acids, maltodextrin, diols and/or a derivative of cellulose, whereas mineral-based water stabilizing compounds preferably contain carbonate, chloride, phosphate, and/or sulfate salts. Most preferably amino acid is L-Lysine salt. Derivative of cellulose is most preferably microcrystalline cellulose, diol is most preferably propylene glycol, carbonate is most preferably sodium bicarbonate, chloride is most preferably sodium chloride, potassium chloride and/or other hydrochloride salts, phosphates are most preferably sodium phosphate and/or potassium phosphate, sulfate salt is most preferably sodium sulfate. The coloring agent is preferably plant based and with nutritional or health related value, most preferably dried and ground sweet potato and/or dried and ground algae. The at least one active component is selected from the group consisting of at least one probiotic, prebiotic, vaccine, antibiotic, organic acid, flavoring, plant extract, essential oil, amino acids, vitamin and mineral. Preferably, the probiotic contains at least one microbial strain, more preferably at least one bacterial strain colonizing the poultry gut, even more preferably at least one poultry gut colonizing bacterial strain from the species *Bifidobacterium animalis, Enterococcus*

*faecium, Pediococcus acidilactici, Lactobacillus reuteri* and/or *Lactobacillus salivarius*, most preferably at least one poultry gut colonizing bacterial strain being *Bifidobacterium animalis* DSM16284, *Enterococcus faecium* DSM16211, *Enterococcus faecium* DSM 21913, *Lactobacillus salivarius* DSM 16531, *Lactobacillus reuteri* DSM 16350 and/or *Pediococcus acidilactici* DSM 16210. Furthermore, the prebiotic is preferred to contain a fructo-oligosaccharide structure supporting growth of colonizing *Bifidobacterium* spp. in the gut, more preferably fructo-oligosaccharides in natural form being inulin, most preferably inulin in form of chicory root. Furthermore, the vaccine preferably contains live, attenuated live and/or dead bacteria, parasites and/or viruses, most preferably vaccines for poultry diseases and/or pathogens comprised of coccidial vaccines with *Eimeria acervulina, E. maxima, E. tenella, E. praecox, E. megatrix, E. brunetti, E. mitis, E. hagani, E. mivati, E. adenoeides, E. gallopavonis, E. meleagrimitis, E dispersa, E. colchici, E. duodenalis, E. tetarto, E. kofoidi, E. legionensis, E. lettyae, E. coloni, E. truncata* and/or *Tyzzeria perniciosa*, Marek's Disease, Newcastle Disease, Infectious Bronchitis, Infectious Bursal Disease, *Mycoplasma gallisepticum*, Hemorrhagic enteritis, Fowl cholera, LaSota, Erysipelas, Encephalomyelitis, *Riemerella anatipestifer*, as well as Duck viral hepatitis, antibiotics preferably are preventative antibiotics used in poultry production like ampicillin, bacitracin, ciprofloxacin, colistin, gentamicin, lincomycin, penicillins, tetracyclines, tylosin and/or virginiamycin. Furthermore flavoring agents, preferably contain vanilla extract and/or cinnamon aldehyde. Furthermore plant extracts preferably contain alkaloids, glycosides, flavonoids, and/or tannins, for alkaloids most preferably berberine, piperine, and/or palmatine, for glycosides most preferably amygdalin and/or cardiac glycosides, for flavonoids most preferably apigenin, chrysin, quercetin and/or rutin, for tannins most preferably ellagitannin and/or gallotannin. Furthermore, essential oils are preferably terpenes, hydrocarbons, and/or oxygenated compounds, for terpenes and hydrocarbons most preferably limonene, myrcene, farnesene, zingiberene, for oxygenated compounds most preferably thymol, eugenol, carvacrol, linalool, citronellol, and/or terpineol. Furthermore organic acids are preferably acetic acid, citric acid, formic acid, lactic acid, malic acid, and/or propionic acid Furthermore amino acids are preferably essential amino acids, most preferably methionine, lysine, threonine, and/or tryptophan. Furthermore vitamins are preferably vitamins A, B, D3, E, K, and/or choline. Furthermore minerals are preferably salts containing calcium, phosphorus, magnesium, manganese, iron, copper, iodine, zinc, and/or cobalt. These products can be mixed before administering, or also can be administered separately. For administering different products at the same time, the method is further developed in that two different soft gels or low viscosity liquids are delivered at the same time by feeding each soft gel or low viscosity liquid to a selected group of fluid atomizers. Hereby it is possible that some of the fluid atomizers are supplied for example with a probiotic with or without a prebiotic, with or without a vaccine, preferably the vaccine targeting the gut, most preferably a vaccine containing viable and/or dead coccidial oocysts, being contained in a soft gel suspension with larger droplet size with a diameter of minimum $1\times10^{-3}$ m, and some of them with a low viscosity liquid for example containing antibiotics and/or vaccines, preferably vaccines targeting the lungs, or other easily soluble substances necessary for the hatchling that need a smaller droplet size with a diameter of up to $1\times10^{-3}$ m. In this respect, the method is further developed such that the soft gel or low viscosity liquid is fed to one of the manifolds by actuating the throttle valve being provided in the reservoir, being connected with the associated reservoir, and by applying pressure. At the same time, the other manifold is fed with the second substance or substance mixture to be distributed by the second throttle valve, being contained in the other reservoir and the substance or substance mixture is sprayed over the hatchlings by the fluid atomizers being connected with the second manifold. Hereby it is possible to provide the poultry hatchlings with more than one essential substance such as vaccine, vitamins, antibiotics or so on without any necessity to perform two passages under the device for dispensing a soft gel into the hatchling tray, even if the two substances cannot be combined in the same fluid needing separate reservoirs, for example antibiotics and probiotics.

With the present method, it is preferred to provide an active ingredient or component selected from the group consisting of at least one probiotic agent, vaccine, antibiotic, flavoring, coloring agent, vitamin and mineral. It is self-explanatory that in the fluid to be provided more than one active component can be contained and that also the amounts contained may differ.

According to a further development of the method, it is characterized in that the fluid to be distributed by the fluid atomizers is a soft gel having a viscosity from 50 to 1000 cps, preferably from 100 to 300 cps and most preferably from 120 to 200 cps, the fluid to be distributed by the fluid atomizers is a low viscosity liquid up to 50 cps, preferably from 20 to 50 cps, and especially with having the option of applying two different fluids having the same or different viscosities, which are then applied by preferably different types of fluid atomizers onto the poultry hatchlings. By choosing e.g. a soft gel having a viscosity from 50 to 1000 cps, preferably from 100 to 300 cps and most preferably from 120 to 200 cps as fluid to be dropped over the poultry hatchlings, it is possible to obtain discrete droplets having an uniform size and volume. By using two different types of fluid atomizers, it is furthermore possible to use different fluids, such as two different soft gels having the same or also different viscosities, and optionally to drop two different active compounds over the hatchlings. For obtaining best results, the method is carried out such that an application volume stream of individual soft gel droplets per mounting rail is up to 600 ml/min, preferably up to 900 ml/min, most preferably up to 1800 ml/min.

This method is further facilitated in that two different fluids are intermittently fed to two different manifolds, whereby switching pulses emitted by a switch sensor actuate the throttle valve being provided in the reservoir intended for one of the two fluids, such as soft gels or low viscosity liquids, and that the fluid selected is fed to the fluid atomizers being connected with the selected manifold. Hereby, it is possible to achieve a further simplification of the device used, along with an operating procedure which is simple and safe and by which it is possible to provide all poultry hatchlings in a tray with an exact and predetermined amount of two different substances, or also two different fluids, such as soft gel and liquid with low viscosity, as needed by the hatchlings.

In order to ensure an exact opening time of the fluid atomizers and to avoid any waste of fluid, the invention is preferably further developed such that the fluid atomizers are opened for a time which corresponds to the time needed for forwarding the hatchling tray about a distance corresponding to the length of the hatchling tray. By adjusting the opening time of the throttle valves in accordance with the requirement, especially in accordance with passage time of the hatchling tray any waste of fluid, especially of soft gel can be avoided.

BRIEF DESCRIPTION OF THE DRAWINGS

In the following the invention will be explained in more detail by way of exemplary embodiments illustrated in the drawings. Therein.

DETAILED DESCRIPTION OF THE INVENTION

Figure 1:
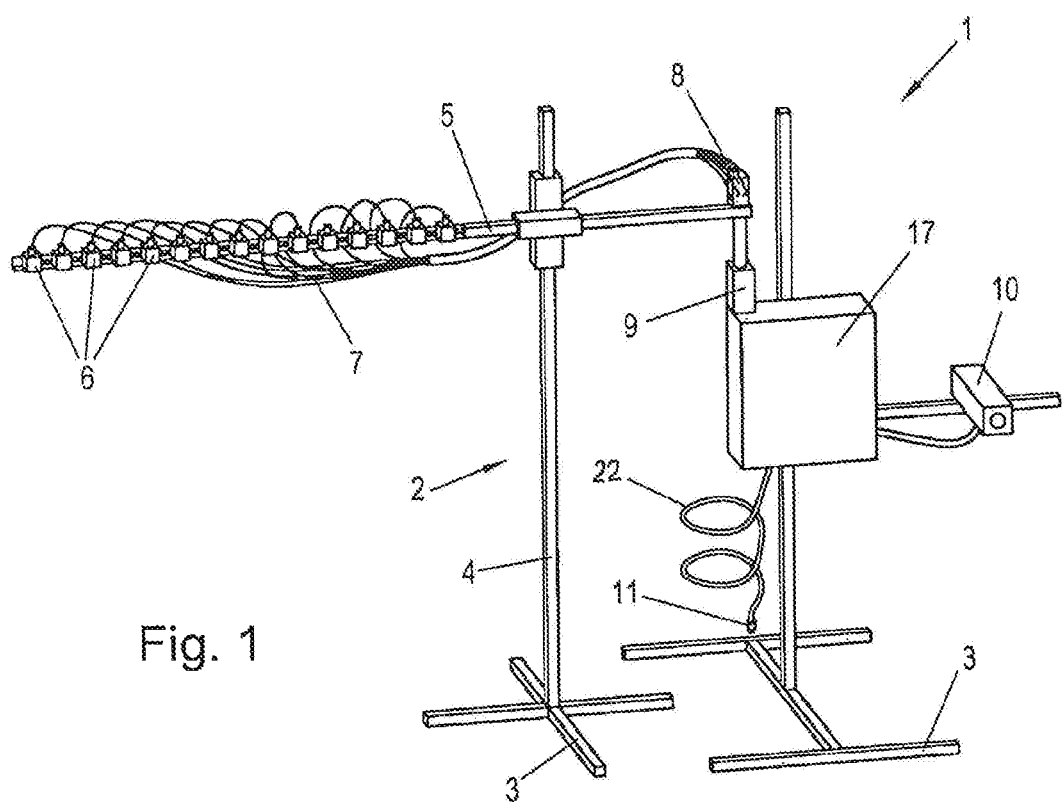
FIG. 1 depicts a partial longitudinal section trough an overall view of a device for dispensing a fluid into trays for poultry hatchlings according to the invention.

FIG. 1 illustrates schematically an apparatus for dispensing a fluid especially a soft gel into trays for poultry hatchlings generally denoted by 1, which apparatus 1 comprising a control unit 17; a throttle valve 11; a pumping unit 9; a supply duct 22 connecting the throttle valve 11 with the pumping unit 9; a manifold 8; fluid atomizers 6 attached to the manifold 8; flexible connecting means 7 connecting the manifold 8 and the fluid atomizers 6; a supporting device 2, comprising two bases 3 and two supporting bars 4.

The supporting bars 4 are preferably adjustable in length and are composed of telescopic rods, for example. Optionally, the mounting rail 5 is directly connected to the supporting bar 4 on which the control unit 17 is mounted. Thus only one base 3 and one supporting bar 4 is required.

Moreover the mounting rail 5 bears a plurality, especially 12 to 28 fluid atomizers 6 which can be fixed at different heights on the supporting device 2. Alternatively the height of the supporting device 2 can by adjusted by pneumatically adjustable bars. Furthermore it is possible to provide two mounting rails 5 which may be arranged in different heights of the supporting bars 4 or also facing to different sides of the apparatus.

Figure 2:
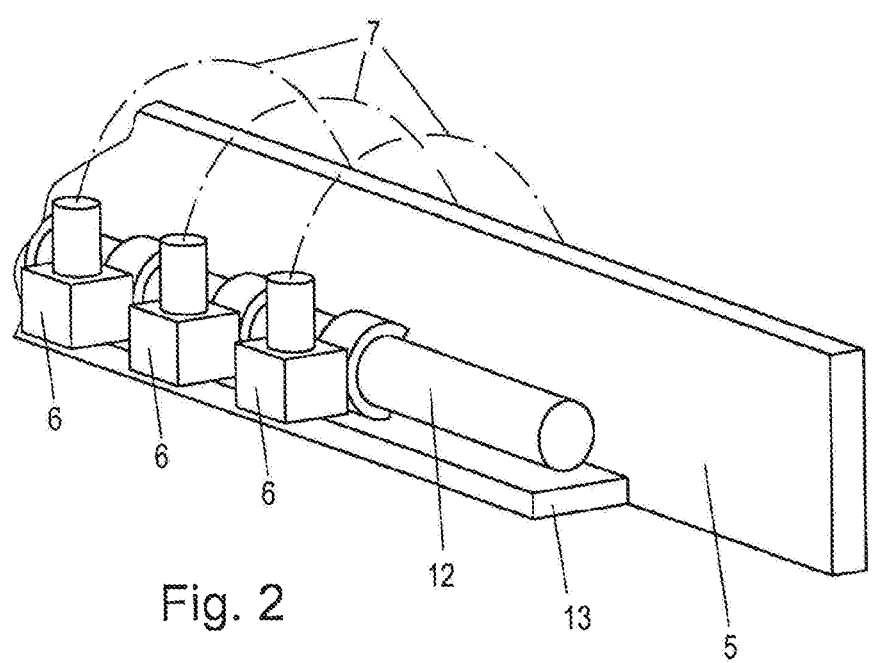
FIG. 2 depicts part of the distributing unit in an enlarged view comprising the mounting rail as well as the fluid atomizers being detachably mounted on the mounting rail.
Figure 3:
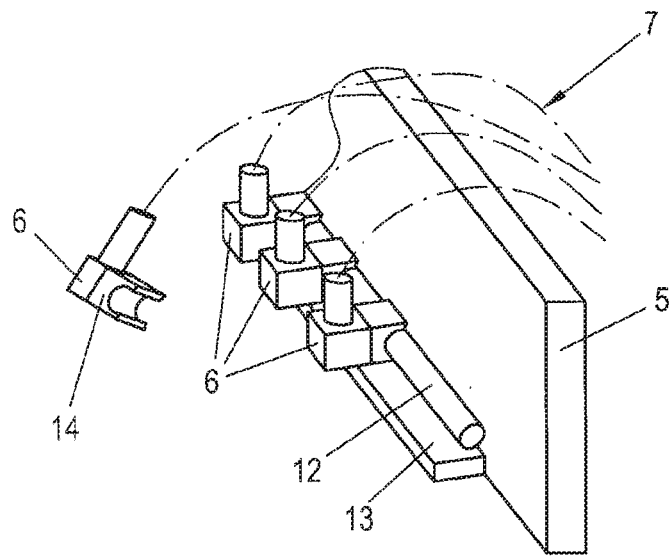
FIG. 3 depicts a detailed view of the distributing unit of FIG. 2, wherein a fluid atomizer integrally provided with a fixing clip is detached from the mounting rail and a fixing clip.

The fluid atomizers 6 can be slid and are release-ably fixed to the mounting rail 5, as described in FIGS. 2 and 3. Each fluid atomizer 6 is connected with the flexible connecting means 7, preferably being a hose, which is in turn connected with the manifold 8. The manifold 8 distributes fluid into the connecting means 7 and further into the fluid atomizers 6. For distributing the soft gel or a liquid, as preferred over a hatchling tray 19, not shown in FIG. 1, the fluid atomizers 6 are in a position for distributing fluid in droplet form, feed by pressure into the hatchling tray and therefor onto the poultry hatchlings housed in the tray, which tray is moved under the mounting rail 5. For providing the pressure necessary for distributing the fluid from a reservoir, not shown in the FIG. 1, to the manifold 8 and then into the fluid atomizers 6, the pumping unit 9 is arranged between the reservoir and the manifold 8.

The pumping unit 9, the proximity sensor 10, as well as the connecting mean 22 being connected with the throttle valve 11 are conducted in a control unit 17, which contains only usual components, necessary for operating the apparatus, such as a power supply, a flow regulator, a pressure gauge or so on, which parts are therefore not described in detail.

To ensure that the fluid drops out of the fluid atomizers 6 only at the time of the passage of a hatchling tray, the device is furthermore equipped with a proximity sensor 10. If the proximity sensor 10 detects the arrival of hatchling tray, it sends a signal to the pumping unit 10 which switches on, as well as a signal to a throttle valve 11 being arranged in the reservoir. After receipt of the signal from the proximity sensor 10, the throttle valve 11 opens and fluid, such as soft gel or a low viscosity liquid will be pumped through the apparatus and into the fluid atomizers 6 and drops over the hatchlings, the drops then being consumed by the poultry hatchling. When the proximity sensor 10 detects the tailing end of a hatchling tray, it sends a further signal to the throttle valve 11 as well as to the pumping unit 9, where after the throttle valve closes and the pumping unit 9 switches off.

For avoiding any submerging of the throttle valve 11 into the fluid being contained in the reservoir, the throttle valve 11 can be equipped with a float, not shown in the figure. Furthermore the working pressure of the pumping unit 9 can be adjusted for being able to deliver higher amounts of fluid(s) onto the hatchlings, or also for being able to pump soft gels with different, especially higher viscosities such as for example soft gels having a viscosity of about 200 cps.

In the illustration according to FIG. 2, the reference numerals of FIG. 1 have essentially been retained, wherein only those parts of the device which differ from FIG. 1 or were not described thus far are described. In FIG. 2, an enlarged view of the mounting rail 5, as well as the fluid atomizers 6 being detachably mounted on a round bar 12 being part of the mounting rail 5 is shown. The round bar 12 is an inseparable part of the mounting rail 5 whereby an L-shaped sheet 13 is provided under the round bar 12 for avoiding an unintentional pivoting of the fluid atomizers 6 being clamped on the round bar 12. The fluid atomizers 6 are provided with a clamping part 14 being clearly shown in FIG. 3. The clamping part 14 has two clamping members made of resilient plastics, which clamping members are able to partially surround the round bar 12 and therefore to hold the fluid atomizers 6 in position. With such clamping members it is however possible to slide each fluid atomizer 6 on the round bar 12 and also to remove it from the round bar 12. Of course it is also possible to clamp additional fluid atomizers 6 onto the round bar 12 and therefore to adapt the device 1 to different sizes of hatchling trays.

It is understood that another design of the mounting rail 5 can be used as long as the fluid atomizers can be positioned along the mounting rail 5, and also removed therefrom. One further example is to use magnetic coupling to flexibly connect of the atomizers 6 onto the mounting rail 5. Furthermore additional fluid atomizers 6 can be attached onto the mounting rail 5 or also on the round bar 12 for ensuring that more fluid can be provided or also two different fluids can be administered at the same time.

The fluid atomizers 6 can be of conventional design and especially one can also choose any kind of valve which can be adapted for delivering fluids, such as soft gels or liquids, for example is it possible to use pressure-actuated valves, flow valves, but also check valves. If check valves are used, it is possible to lock or additionally open individual valves whereby a further adjustment to different conditions such as different sizes of hatchling trays, different number of poultry hatchlings in each tray or also different feeding speed of the trays, can be accommodated.

Figure 4:
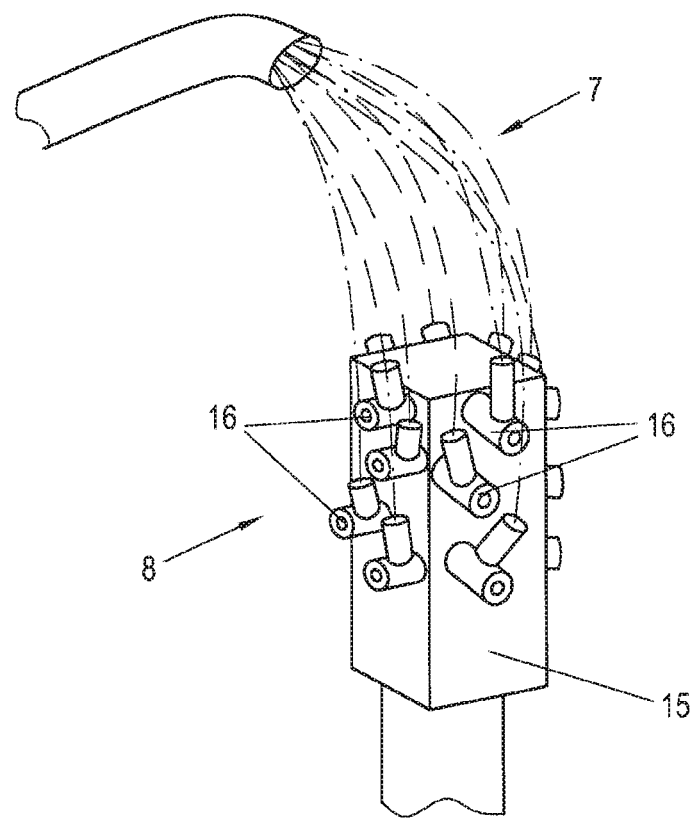
FIG. 4 depicts an enlarged view of an embodiment of the manifold according to the present invention.

In FIG. 4 an enlarged view of an embodiment of the manifold 8 is shown. The manifold 8 consist of a hollow container 15 which is for example connected via a quick coupling 16 with a pipe connecting the manifold 8 to the pumping unit 9. At the outer periphery of the hollow container 15 a number of quick couplings 16 corresponding to the number of hoses 7 is provided. The quick couplings 16 can act as flow valves for adjusting the amount of fluid to be provided to the fluid atomizers 6. Such an embodiment allows to perform maintenance on the apparatus without long interruption time of the apparatus and especially nearly all parts can be exchanged separately.

Figure 5:
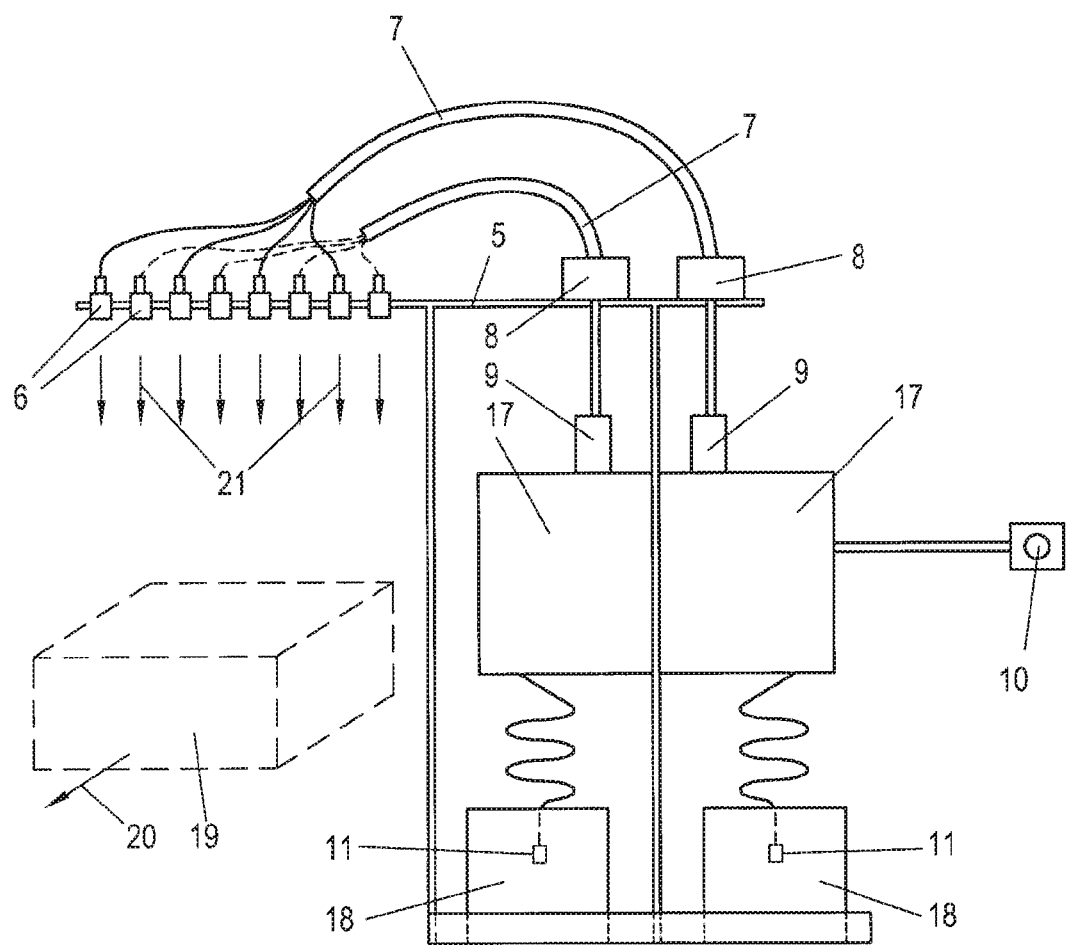
FIG. 5 depicts a second embodiment of the device for dispensing a fluid into trays for poultry hatchlings according to the invention, which device is developed for providing fluid(s) from two different reservoirs.

In FIG. 5 a second embodiment of the apparatus for dispensing a fluid into trays 19 for poultry hatchlings is shown. In the illustration according to FIG. 5, the reference numerals of FIG. 1 to FIG. 4 have essentially been retained from FIG. 1, wherein only those parts of the device which differ therefrom will be described. The operation of the apparatus 1, according to FIG. 5 is the same as described in connection with FIG. 1. The only difference is that the manifold 8, the pressure unit 9, the control unit 17, the throttle valve 11 as well as the reservoir 18 are provided in duplicate. The proximity sensor 10 switches both parts if the device 1. Each manifold 8 is connected via hoses 7 with, for example, one half of the fluid atomizers 6. With such a device 1 it is possible to distribute two different fluids containing for example two different active components, such as vaccines, antibiotics, vitamins, nutrients or so on at the same time. The fluid can be of different color, can show different viscosities or can be provided with a different through flow for adapting the device 1 to different requirements.

According to the invention, it is also possible to feed two different fluids intermittently to the two different manifolds 8, whereby switch pulses emitted by the control unit actuate the respective throttle valve 11.

The apparatus 1 according to FIG. 5 can be adapted such that two mounting rails 5 are provided, which mounting rails 5 can be arranged at both sides of the supporting bars 4 or also at the same side thereof but in different heights thereof. Both mounting rails 5 can also be connected to the supporting bar 4 of the control unit 17.

Furthermore in FIG. 5 is shown schematically a hatchling tray 19 which is moved in the direction of the arrow 20. As long as the tray 19 is under the mounting rail 5 fluid will be distributed through the fluid atomizers 6 and drops, as indicated with arrows 21, into the tray 19, in which the poultry hatchlings are housed. At the moment where a sensor, not shown in the Fig., detects the trailing end of the hatchling tray 19, a signal will be sent to a control unit, not shown, which stops immediately the pumping unit 9 and therefore delivery of fluid to the fluid atomizers 6. If in turn the proximity sensor 10 detects the leading edge of the next hatchling tray 19 arriving, it will send a signal to the control unit 17 which will actuate the pump 9 and start delivery of fluid the fluid atomizers 6.

It is understood that further embodiments are also within the scope of the invention such as for example a variant containing only one reservoir 18, one control unit 17 and one pumping unit 9 but two manifolds 8 and two mounting rails 5. With such a device 1 it will be possible to adjust the amount of fluid distributed to the size or the number of the tray(s) 19 and to the number of poultry hatchlings contained therein.

The invention claimed is:

1. A dispensing apparatus for delivering droplets of fluids containing at least one active component, onto poultry hatchlings that are present in movably mounted hatchling trays comprising at least one reservoir, at least one pumping unit, each at least one pumping unit connected to the at least one reservoir containing a fluid, at least one manifold is connected to the at least one pumping unit, and to at least one control unit, a plurality of fluid atomizers being connected by flexible connecting conduits to the at least one manifold, whereby the fluid atomizers are detachably and slidably connected with at least one mounting rail, and the fluid atomizers each having flow openings, the fluid openings having one of: of different diameters and adjustable flow openings, so as to adjust a fluid flow by passing through openings of different diameters or adjusting the flow openings as opposed to turning the fluid flow on and off, to avoid the poultry hatchlings in the movably mounted hatchling tray obtaining too much active ingredient and/or fluid, the fluid atomizers are placed onto the at least one mounting rail, wherein a distance between each directly adjacent fluid atomizer on the at least one mounting rail is not the same, and a distance between each directly adjacent fluid atomizer is smaller in a middle region of the mounting rail compared to edge regions thereof, the distance between two directly adjacent fluid atomizers located in the middle region of the mounting rail being between 20 to 60% of the distance between two directly adjacent fluid atomizers located in an edge region of the mounting rail to assure an even and uniform distribution of the fluid to all of the poultry hatchlings in the movably mounted hatchling tray.

2. The apparatus according to claim 1, wherein the apparatus has the fluid atomizers mounted on a single mounting rail.

3. The apparatus according to claim 1, wherein the at least one reservoir comprises two reservoirs, each provided with a throttle valve.

4. The apparatus according to claim 1, wherein the at least one pumping unit is interposed between the at least one reservoir and the at least one manifold and that a switching pulse obtained from a proximity sensor actuates the at least one pumping unit.

5. The apparatus according to claim 1, wherein the at least one pumping unit comprises two pumping units, providing different pressure.

6. The apparatus according to claim 1, wherein each pumping unit is a pneumatic pump, actuated to pump the fluid from the at least one reservoir to the fluid atomizers.

7. The apparatus according to claim 1, wherein the at least one manifold comprises two manifolds, being connected with one of the at least one pumping unit or with a different one of the at least one pumping units.

8. The apparatus according to claim 1, wherein the at least one mounting rail is height adjustable and connected to a supporting structure.

9. The apparatus according to claim 1, wherein the at least one mounting rail comprises two adjustable mounting rails on top or adjacent to each other.

10. The apparatus according to claim 1, wherein the apparatus contains up to 28 fluid atomizers, whereby at least 4 of the fluid atomizers are provided on each mounting rail.

11. A method for delivering fluid droplets onto poultry hatchlings present in moving hatchling trays, wherein at least one fluid containing at least one active component, selected from the group consisting of probiotic agents, vaccines, antibiotics flavorings, coloring agents, vitamins and minerals, is prepared as a prepared fluid, the prepared fluid is placed in the at least one reservoir of the fluid dispensing apparatus according to claim 1;

the distance between the fluid atomizers is adjusted in accordance with at least one of the features:

a hatchling tray geometry, hatchling distribution in the hatchling trays, hatchling density in the hatchling trays and/or a hatchling tray speed;

the moving hatchling trays containing the poultry hatchlings are placed beneath the fluid atomizers of the fluid dispensing apparatus;

the at least one pumping unit is switched on and the at least one fluid is pumped with a pressure convenient for feeding the prepared fluid from the at least one reservoir through the at least one manifold to the fluid atomizers, distributing the prepared fluid as colored droplets onto the poultry hatchlings.

12. The method according to claim 11, wherein the prepared fluid is at least one of a) a soft gel fluid having a viscosity of from 50 to 1000 cps, or b) a low viscosity soft gel fluid having a viscosity up to 50 cps, and the prepared fluid is distributed by the fluid atomizers each having flow openings of different diameter or an adjustable flow opening onto the poultry hatchlings in the moving hatchling trays.

13. The method according to claim 11, wherein two different prepared fluids are intermittently fed to two different manifolds of the at least one manifold, whereby switching pulses emitted by a switch sensor actuate a throttle valve provided in the at least one reservoir for one of the two different prepared fluids and that a prepared fluid selected is fed to one of the fluid atomizers being connected to one of the two different manifolds.

14. The method according to claim 11, wherein the at least one fluid comprises two different fluids delivered at the same time.

15. The method according to claim 11, wherein the fluid atomizers are opened for a time, which corresponds to the time needed for forwarding the moving hatchling trays about a distance corresponding to the length of the moving hatchling tray.

* * * * *